United States Patent

Schwerdhofer

[15] 3,648,809
[45] Mar. 14, 1972

[54] TWO SPEED BICYCLE TRANSMISSION WITH BRAKE

[72] Inventor: Hans Joachim Schwerdhofer, Schweinfurt am Main, Germany

[73] Assignee: Fichtel & Sachs AG, Schweinfurt am Main, Germany

[22] Filed: July 6, 1970

[21] Appl. No.: 52,166

[30] Foreign Application Priority Data

July 10, 1969 Germany .................... P 19 34 972.5

[52] U.S. Cl. ........................... 192/6 A, 192/47, 74/750 B
[51] Int. Cl. ................................................ B60k 29/02
[58] Field of Search ............................................ 192/6 A, 47

[56] References Cited

UNITED STATES PATENTS

| | | | |
|---|---|---|---|
| 2,799,183 | 7/1957 | Rhein et al. | 192/6 A X |
| 3,135,368 | 6/1964 | Shimano | 192/6 A |
| 3,136,179 | 6/1964 | Kaiser | 192/6 A X |
| 3,351,165 | 11/1967 | Shimano | 192/6 A |
| 3,366,206 | 1/1968 | Shimano | 192/6 A |

*Primary Examiner*—Benjamin W. Wyche
*Attorney*—Kelman and Berman

[57] ABSTRACT

A multiple speed hub for the rear wheel of a bicycle or the like has a planetary gear transmission and pawl-and-ratchet clutches respectively coupling the planet carrier and the ring gear of the transmission to the hub shell, the planet carrier serving as the driver of the hub. The pawls on the ring gear can be disengaged from a ratchet on the hub shell by a flanged disc whose hub is rotatably mounted on the driver, and whose flanges has an internal cam face engaging the pawls. Cam lobes having each a gentle and a steep slope are provided on the cam face, and the ring is normally rotated by abutting engagement of the pawls with the steep flanks, but braked by a frictional coupling to a stationary or more slowly rotating hub element. During back pedaling, the pawls travel over the gentle flanks of the braked control disc to drop into a portion of the cam face differently spaced from the hub axis, whereby the pawls may be engaged with or disengaged from the cooperating ratchet and the hub shifted from one gear ratio to another.

3 Claims, 4 Drawing Figures

PATENTED MAR 14 1972 3,648,809

INVENTOR
Hans Joachim Schwerdhöfer
By: Kilman and Berman
AGENTS

PATENTED MAR 14 1972  3,648,809

INVENTOR.
Hans Joachim Schwerdhöfer
By: Kelman and Berman
AGENTS

TWO SPEED BICYCLE TRANSMISSION WITH BRAKE

This invention relates to multiple speed hubs for a bicycle or like vehicle, and particularly to an improved speed shifting mechanism for a hub in which a multiple speed transmission is interposed between a driver member of the hub and the hub shell for rotating the hub shell at a selected one of several speeds when the driver member rotates at a predetermined forward speed.

In its more specific aspects the invention is concerned with an improved speed selector mechanism for a transmission having a plurality of transmission members connected for simultaneous rotation at different respective speeds with each other and with the driver member, and two clutches respectively interposed between two of the transmission members and the hub shell. It is known to provide such a hub with a speed selector mechanism which engages and disengages the clutch interposed between the hub shell and the more rapidly rotating one of the two transmission members. This clutch has several pawls and a ratchet annular about the hub axis and enveloping the pawls.

Known selector mechanisms of this type may include a perforated sleeve interposed between the controlled pawls and the associated ratchet and permitting their engagement when the openings in the sleeve are aligned with the pawl. While this arrangement has been used successfully, it requires a relatively great force to shift the pawls by means of the perforated sleeve, and the brake applied to the sleeve during back pedalling to cause relative angular movement of the sleeve and of the pawls must be so strong to withstand this force that it offers a constant, small, but significant resistance to operation of the hub during forward pedalling. The sleeve cannot be guided precisely between the pawls and the cooperating ratchet. It tends therefore to wear relatively quickly and to cause malfunctioning of the hub.

A primary object of this invention is the provision of a control element for engaging and disengaging the pawls of a controlled pawl-and-ratchet clutch in a hub of the general type described which can be mounted in a precisely determined position, and which requires but a minimal torque for being shifted relative to the controlled pawls between the pawl-engaging and the pawl-retracting position.

The control element of the invention is a flanged disc having a hub portion whose internal bearing face may rotatably engage another transmission member and whose annular axial flange has an internal cam face for engagement with the controlled pawls.

The cam face has several cam lobes, each having a steep flank and a more gentle flank, the steep flank providing an abutment permitting the pawls to drive the control disc during forward rotation of the driver, and the pawls moving readily over the gentle flank during back pedaling. The torque required for shifting the pawls relative to the suitably braked control disc is particularly small when the gentle flank has two circularly arcuate, smoothly merging portions of which one is centered in the hub axis whereas the other one is cylindrically arcuate about an axis parallel to, but offset from the hub axis. The portions of the cam face between the peaks of the lobes are differently spaced from the hub axis in such a manner that the pawls engage the ratchet when engaging a steep flank in a cam portion more remote from the axis, and are held out of engagement with the ratchet when engaging the steep flank of a lobe in a cam face portion nearer the hub axis. There are as many sets of differently shaped cam lobes as there are pawls.

The control disc is preferably made of plastic for a low coefficient of friction in engagement with the metallic pawls, but may also be made from steel by extrusion molding.

Other features, additional objects, and many of the attendant advantages of this invention will readily be appreciated as the same becomes better understood by reference to the following detailed description of preferred embodiments when considered in connection with the appended drawing in which.

Figure 1:
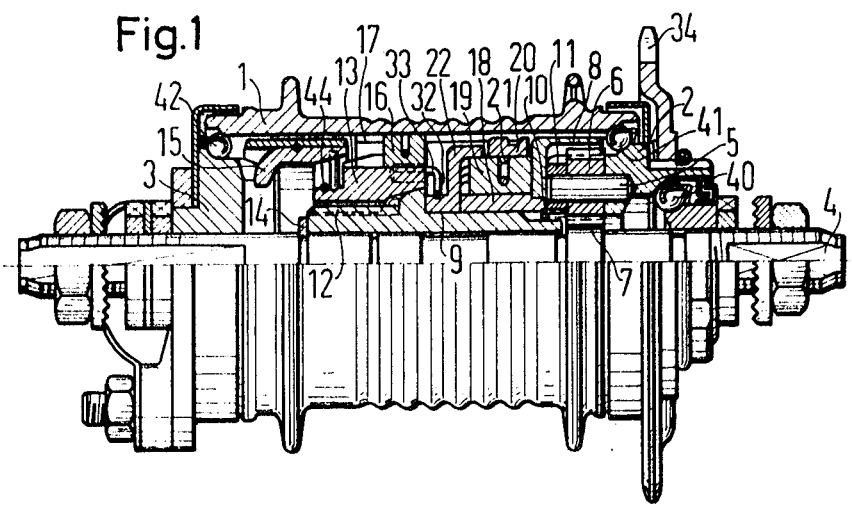
FIG. 1 shows a dual-speed bicycle hub of the invention with coaster brake in rear elevation and partly in section on its axis of rotation.

Referring now to the drawing in detail, and initially to FIG. 1, there is seen a hub for the rear wheel of a bicycle whose operating elements are largely enclosed in a hub shell 1. The two axial ends of the hub shell are rotatably mounted by means of ball bearings 41, 42 on a tubular driver 2 and on a bearing ring 3 threadedly adjustable, but normally fixed on a shaft 4, coaxial with the hub shell 1, which is fixedly mounted in the frame of a non-illustrated bicycle under normal operating conditions. The driver 2 is rotatably mounted on the shaft 4 by means of a ball bearing 40.

The driver 2 also serves as a planet carrier for the two-speed transmission of the hub. Three planet shafts 5, equiangularly spaced about the hub axis, carry respective planet gears 6, only one shaft and the associated gear being shown. The gears 6 simultaneously mesh with a sun gear 7 integral with the shaft 4 and with an internally toothed ring gear 8. A portion of the driver 2 axially projects outside the shell 1 and carries a sprocket 34 normally engaged by a drive chain.

A drive sleeve 9 is rotatably mounted on the shaft 4, and one axial end of the sleeve has teeth 10 engaged with mating teeth of an annular disc 11 which is mounted on the free ends of the planet shafts 5. The sleeve 9 thus rotates with the driver 2 in all operative conditions of the hub, and is a separate element only for the convenience of assembly. The axial end portion of the sleeve 9 remote from the disc 11 has coarse external threads 12 about the hub axis which are engaged by mating internal threads on a brake cone 13. The sleeve 9 is secured in its axial position by a retaining ring 14 on the shaft 4. A friction spring 44 normally loosely envelops the cone 13 and is fastened to an axially slotted conical brake shell 15 attached to the stationary bearing ring 3.

Two pawls 16 are pivotally mounted on the brake cone 13 in diametrically opposite positions and engage a ratchet rim constituted by axial ribs 17 on the inner face of the shell 1 under the biasing force of a pawl spring, the pawl 16 and ratchet rim 17 forming an overrunning clutch which drivingly couples the hub shell 1 to the driver 2 as long as the rotary speed of the hub shell is not greater than that of the driver.

A second clutch which may transmit torque from the driver 2 to the hub shell 1 includes a pawl carrier 18 rotatable on the sleeve 9 between the brake cone 13 and the ring gear 8 and connected to the latter for joint rotation by engaged projections and recesses, as described above with reference to the teeth 10. Two pawls 19 pivoted on the carrier 18 mesh with a ring 20 having internal ratchet teeth 21 and secured in the hub shell 1 against rotation by mating engagement with the ribs 17.

Figure 4:
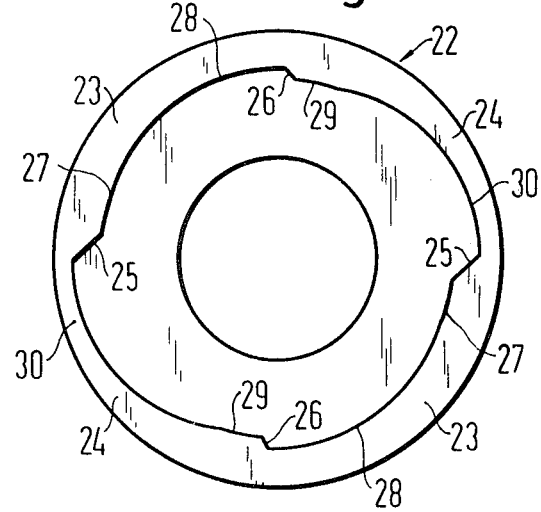
FIG. 4 shows the disc of FIG. 3 in an axial view.
Figure 3:
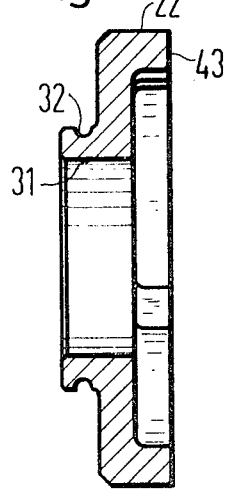
FIG. 3 illustrates a flanged control disc of the invention, common to the hubs of FIGS. 1 and 2, in enlarged axial section.

The ring 20 reduces the effective diameter of the second clutch 19/21 to less than that of the clutch 16/17, thereby permitting respective axially terminal portions of the pawls 19 to be enveloped by a flanged, annular control disc 22 better seen in FIGS. 3 and 4. A hub portion 31 of the disc 22 is rotatably seated on the sleeve 9, and its outer circumference is formed with an annular groove 32 of semicircular cross section. The annular end portion of a friction spring 33 (FIG. 1) is received in the groove 32. The other end portion of the spring 33 extends radially from the groove and enters an axial bore of the cone 13.

The flange 43 of the disc 22 is axially coextensive with the terminal pawl portions, not themselves seen in FIGS. 3 and 4. The flange 43 has an inner, annular cam face consisting of two identical opposite quadrants 23 separated by a pair of identical quadrants 24. The cam face of each quadrant 23 has a first circumferential portion 28 which is circular about the hub axis and smoothly blends into a second circular portion 27 whose axis of curvature is offset from the hub axis os that the eccentric face portion 27 slopes gently toward the center of the disc 22 to form a flank of a cam lobe whose other flank 25 steeply slopes in a radially outward direction.

The cam face of each quadrant 24 has an eccentrically circular or cylindrical portion 30 which slopes gently from the bottom of an adjacent cam face portion 25 toward the hub axis as one flank of a cam lobe whose other flank 26 slopes steeply to the adjacent cam portion 28. The last mentioned cam lobe has a dwell 29 which smoothly blends with the cam portion 30 and is circular about the hub axis. The circular cam portions 28 of the quadrants 23 are substantially nearer the hub axis than the parts of each quadrant 24 farthest removed from the hub axis where the cam portions 30, 25 meet. The pawl springs hold the pawls 19 in engagement with the internal cam face on the flange 43.

The hub shown in FIG. 1 operates as follows:

When the pawls 19 are located in the corner formed by the cam portions 23, 26, they are too close to the hub axis to engage the ratchet teeth 21 of the ring 20. When the driver 2 is turned by the non-illustrated chain during normal forward pedaling, the rotating sleeve 9 causes the brake cone 13 to move on the threads 12 toward the right, as viewed in FIG. 1 until it abuts against a collar on the sleeve, and thereafter to rotate with the sleeve 9. The pawls 16 on the cone 13 engage the ratchet ribs 17 and drive the hub sleeve 1 at the rotary speed of the driver 2.

When the pawls 19 are located in the corner formed by the cam portions 25, 30, they are far enough from the hub axis to engage the ratchet teeth 21. During normal forward pedaling, the pawl carrier 18 which rotates with the ring gear 8 at the speed of the latter is coupled to the hub shell 1, and the latter moves faster than the driver 2, whereby the ratchet ribs 17 overtravel the pawls 16.

The hub transmission is shifted between low speed and high speed by back pedaling. The brake cone 13, which is frictionally coupled to the brake shell 15 by the spring 44, stands still during back pedaling, and rotation of the control disc 22 also stops, the disc being coupled to the cone 13 by the friction spring 33. The pawls 19, however, turn backwardly with the ring gear 8. If they were initially near the steep cam face portion 25, they move toward the cam face portion 26, and vice versa.

The brake cone 13 travels on the threads 12 axially toward the left, as viewed in FIG. 1, during the backward rotation of the sleeve 9 caused by back pedaling while rotation of the cone 13 is prevented. Ultimately, the cone engages and expands the conical brake shell 15, whereby further back pedaling becomes impossible. The pitch and length of the threads 12 are selected so that only one speed change can take place during back pedaling before the cone 13 is stopped by the shell 15. The rider thus distinctly feels when he has changed gears.

When it is intended to brake the hub by back pedalling, a gear change automatically takes place. This is often desirable when braking while travelling in high gear, and may be corrected by a brief back pedaling motion when undesired.

Figure 2:
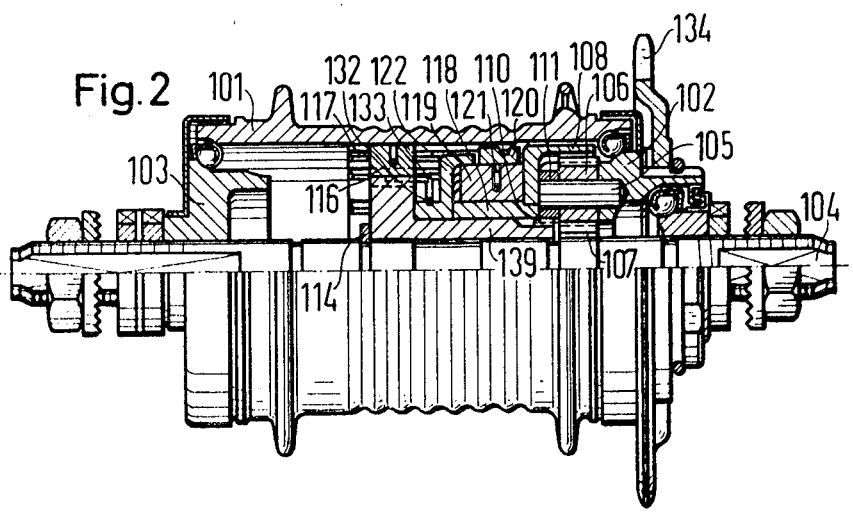
FIG. 2 shows a modified hub of the invention without coaster brake.

The hub illustrated in FIG. 2 is closely similar to that described with reference to FIG. 1 and employs the same control disc, but lacks a coaster brake. Elements which are identical with or closely similar to analogous elements shown in FIG. 1 are designated by the same reference numerals augmented by 100. Such common elements include the hub shell 101, driver 102, bearing ring 103, shaft 104, planet gearing 105, 106, 107, 108, teeth 110 on the driver 102, planet retaining disc 111, retaining ring 114, ratchet ribs 117, ring 120 with ratchet teeth 121, control disc 122, and sprocket 134.

A sleeve 139 similar to the drive sleeve 9 and coupled to the driver 102 by the teeth 110 has an integral radial flange on which the pawls 116 are mounted, and which is coupled to the control disc 122 coaxially rotatable on the sleeve 139 by a friction spring 133 substantially identical with the aforedescribed spring 33 and partly received in an annular circumferential groove 132 of the disc.

When the pawls 119 are disengaged by the control disc 122, the driver is directly coupled to the hub shell 101 by the driving sleeve 139, the pawls 116, and the ratchet ribs 117 of the hub shell, and torque is transmitted from the driver 102 to the shell 101 by the pawls 119 in the engaged condition of the latter to drive the shell at the speed of the ring gear 108.

During back pedaling, the pawls 119 turn backward at the rotary speed of the ring gear 108 whereas the control disc 122 is rotated backward at the lower speed of the driver 102 with which it is coupled by the spring 133. The difference in circumferential speed causes the pawls 119 to travel along the internal cam face of the control disc 122 as described with reference to FIG. 1.

The relative angular movement of the control disc 22, 122 and of the pawls 19, 119 which is needed for a gear change is approximately 90°. If it be assumed that the transmission ratio of the planetary gearing is 1.36:1 in high gear, the driver 2, 102 must move through an angle of about 250° to cause a relative angular displacement of 90° between the control ring 22, 122 and the pawls 19, 119. If the transmission ratio between the non-illustrated pedals and the sprocket 34, 134 is about 2.5:1, as is customary, the pedals must turn through an angle of about 100° to cause a gear shift. This angle is sufficiently great that the rider is not likely to turn the pedals backward until he shifts the hub transmission twice.

If the friction spring 133 in the hub of FIG. 2 were secured to a stationary element, a pedal movement of 26° would be sufficient with the assumed transmission ratios for shifting from one gear to the other, and a pedal movement of 52° would be sufficient to revert to the original transmission ratio. It would be difficult to limit back pedaling to an angle within the narrow range between 26° and 52°.

It should be understood, of course, that the foregoing disclosure relates only to preferred embodiments of the invention, and that numerous modification or alterations may be made therein without departing from the spirit and scope of the invention as set forth in the appended claims.

What is claimed is:

1. In a multiple speed hub including a shaft having an axis, a driver member and a hub shell mounted on said shaft for rotation about said axis, means for rotating said driver member in a forward direction or in a backward direction, and a multiple speed transmission operatively interposed between said driver member and said hub shell for rotating said hub shell at a selected one of several speeds when said driver member rotates in said forward direction at a predetermined speed, the transmission including a plurality of transmission members connected for simultaneous rotation at different respective speeds with each other and with said driver member, and two clutches respectively interposed between two of said transmission members and said hub shell, and speed selector means for engaging and disengaging one of said clutches, said one clutch being interposed between the more rapidly rotating one of said two transmission members and said hub shell and including a plurality of pawl members and a ratchet member annular about said axis and enveloping said pawl members, said speed selector means being effective for engaging and disengaging said pawl and ratchet members, the improvement in the speed selector means which comprises:

a. a control element including a hub portion having an inner bearing face mounted for rotation about said axis and a flange portion having an annular cam face directed toward said axis;
 b. biasing means biasing said pawl members toward camming engagement with said cam face,
  1. respective portions of said cam face being nearer and more remote from said axis in such a manner that said pawl members engage said ratchet member in a first relative angular position of said control element and of said pawl members and are disengaged from said ratchet member in a second angular position of said control element and of said pawl members;
 c. abuttingly engageable means on said control element and on said pawl members for rotation of said control element by said pawl members in said first and second positions when said driver member rotates in said forward direction; and d. operating means for shifting said pawl members and said control element relative to each other between said positions,
　1. said operating means including brake means for impeding rotation of said control element when said driver member is rotated in a backward direction.

2. In a hub as set forth in claim 1, said brake means including a friction spring interposed between said control member and said shaft.

3. In a hub as set forth in claim 1, said brake means including a friction spring interposed between said control element and one of said transmission members rotating at a speed different from the speed of said one transmission member.

\* \* \* \* \*